United States Patent [19]

Attanasio et al.

[11] 3,996,449

[45] Dec. 7, 1976

[54] OPERATING SYSTEM AUTHENTICATOR

[75] Inventors: Clement Richard Attanasio, Peekskill; Laszlo Antal Belady, Yorktown Heights, both of N.Y.

[73] Assignee: International Business Machines Corporation, Armonk, N.Y.

[22] Filed: Aug. 25, 1975

[21] Appl. No.: 607,410

[52] U.S. Cl. .................. 235/61.7 R; 340/149 R
[51] Int. Cl.² .................. G06K 5/00; H04Q 5/02
[58] Field of Search ............... 235/61.7 R, 61.7 B; 340/149 A, 149 B

[56] References Cited

UNITED STATES PATENTS

| 3,611,293 | 10/1971 | Constable et al. | 340/149 A |
| 3,846,622 | 11/1974 | Meyer | 235/61.7 B |
| 3,892,948 | 7/1975 | Constable | 340/149 R |

*Primary Examiner*—Daryl W. Cook
*Attorney, Agent, or Firm*—Jack M. Arnold

[57] ABSTRACT

An operating system authenticator for determining if an operating system being loaded in a computer is valid. A user's identification code or secret key which is unique to the operating system, and a verifier value which is a predetermined function of a valid operating system and the identification code are respectively stored. A hash function, which is a function of the operating system being loaded and the identification code, is generated by the authenticator. After the operating system is loaded, the hash function is used as an authenticating value and compared with the verifier value for determining the authenticity of the loaded operating system.

8 Claims, 4 Drawing Figures

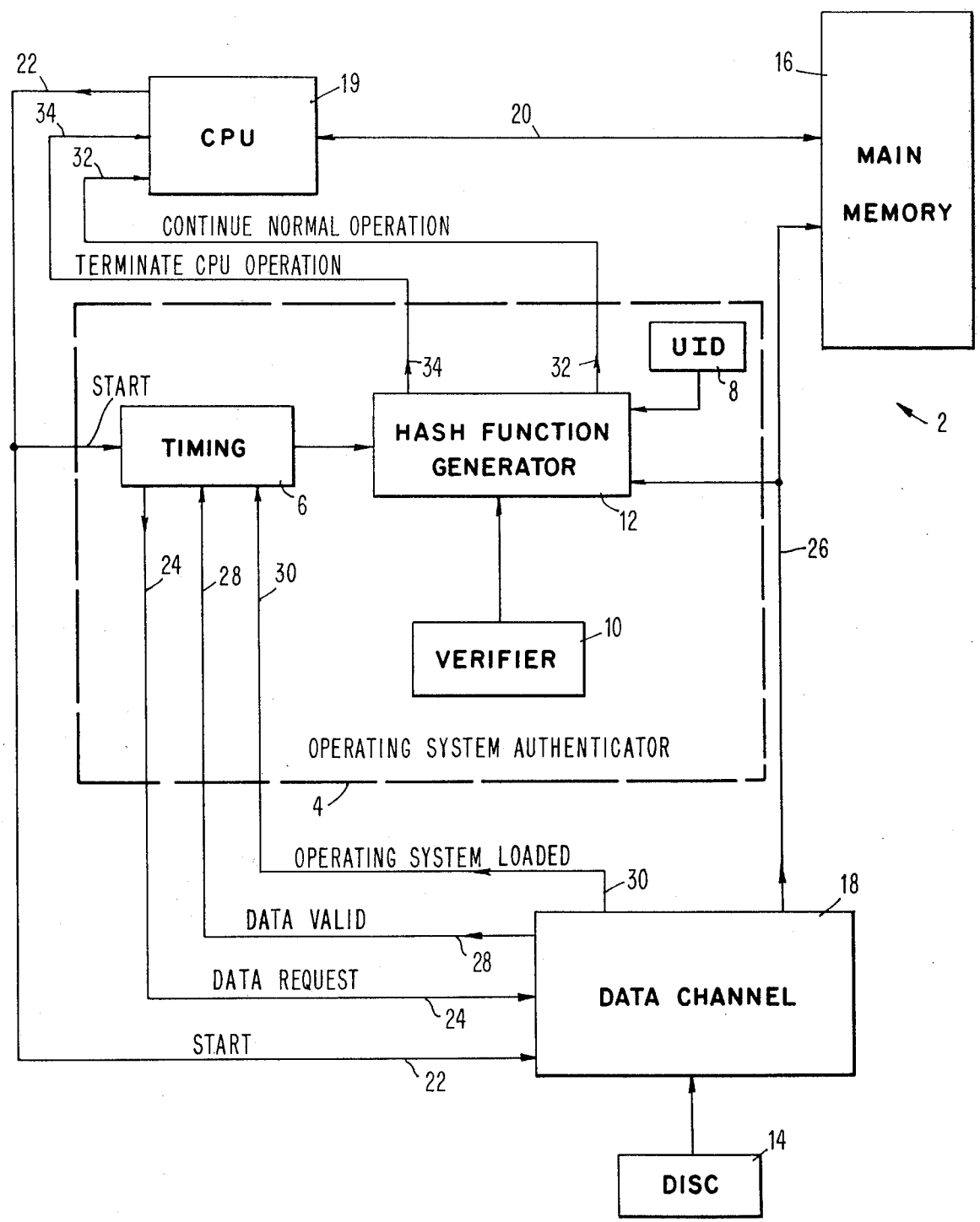

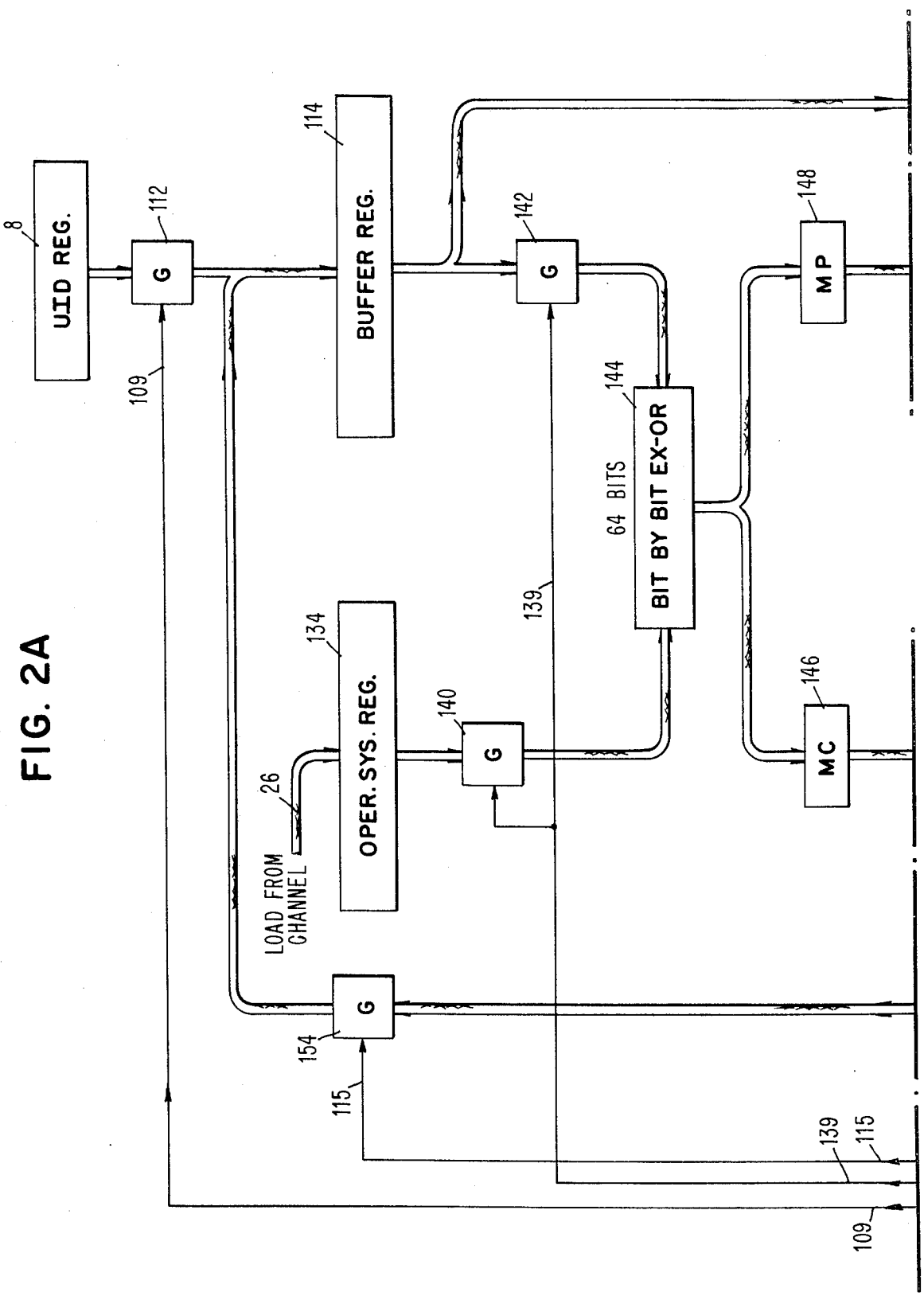

OPERATING SYSTEM AUTHENTICATOR

BACKGROUND OF THE INVENTION

In the past, there have been no means available for treating operating system code not resident in main storage of a computer, that is operating system code stored on tape, disk or the like, any differently than data having far lower security requirements. The lack of security results in two problem areas.

The first problem area is with respect to the non-secured communication channel between the computer manufacturer and the customer. For example, a typical penetration of security is to deliver the penetrator's code to a customer, counterfeiting the computer manufacturer's packaging and delivery procedures.

The second problem area results from the fact that the copy of the operating system on auxiliary storage is under control of the operating system's file management component, and a successful subversion of the file management component can be used to change the copy of the operating system on disk, which if the change is undetected, will subsequently be loaded in place of the valid operating system.

As set forth above, the manufacturer's packaging and delivery techniques are easily counterfeited, so another method must be devised to authenticate an operating system. It has been suggested that a parity type check be performed on the operating system, but it has been found that such a parity check is easily subverted.

According to the present invention, the validity of a program such as an operating system being loaded in a computer is authenticated in an operating system authenticator through the use of a user's identification code or secret key and a verifier code which are unique to a valid operating system. The operating system to be authenticated is concurrently loaded into main memory and the system authenticator. A hash function is generated in the authenticator as a function of the user's identification code and the operating system being loaded. After the complete operating system has been loaded, the hash function is compared with the verifier value. If they compare, the loaded operating system is valid, and if there is a lack of comparison the loaded operating system is invalid, and computer operation is terminated.

SUMMARY OF THE INVENTION

According to the present invention, method and apparatus is disclosed for determining the authenticity of a program being loaded in a computer. There is means for storing an identification code unique to the program. Also included are means for generating an authenticating value which is a function of the identification code and the program being loaded. Finally, there is means for determining the authenticity of the program being loaded in response to comparing the authenticating value and a prestored verifier value which is a predetermined function of a valid program and the identification code.

BRIEF DESCRIPTION OF THE DRAWINGS

FIG. 1 is a block diagram representation of a computer system including an operating system authenticator.

FIG. 2 is a layout showing the arrangement of the sheets of drawings which make up FIGS. 2A through 2C.

FIGS. 2A through 2C illustrate a block diagram of the operating system authenticator according to the present invention.

DESCRIPTION OF THE PREFERRED EMBODIMENT

Figure 2B:
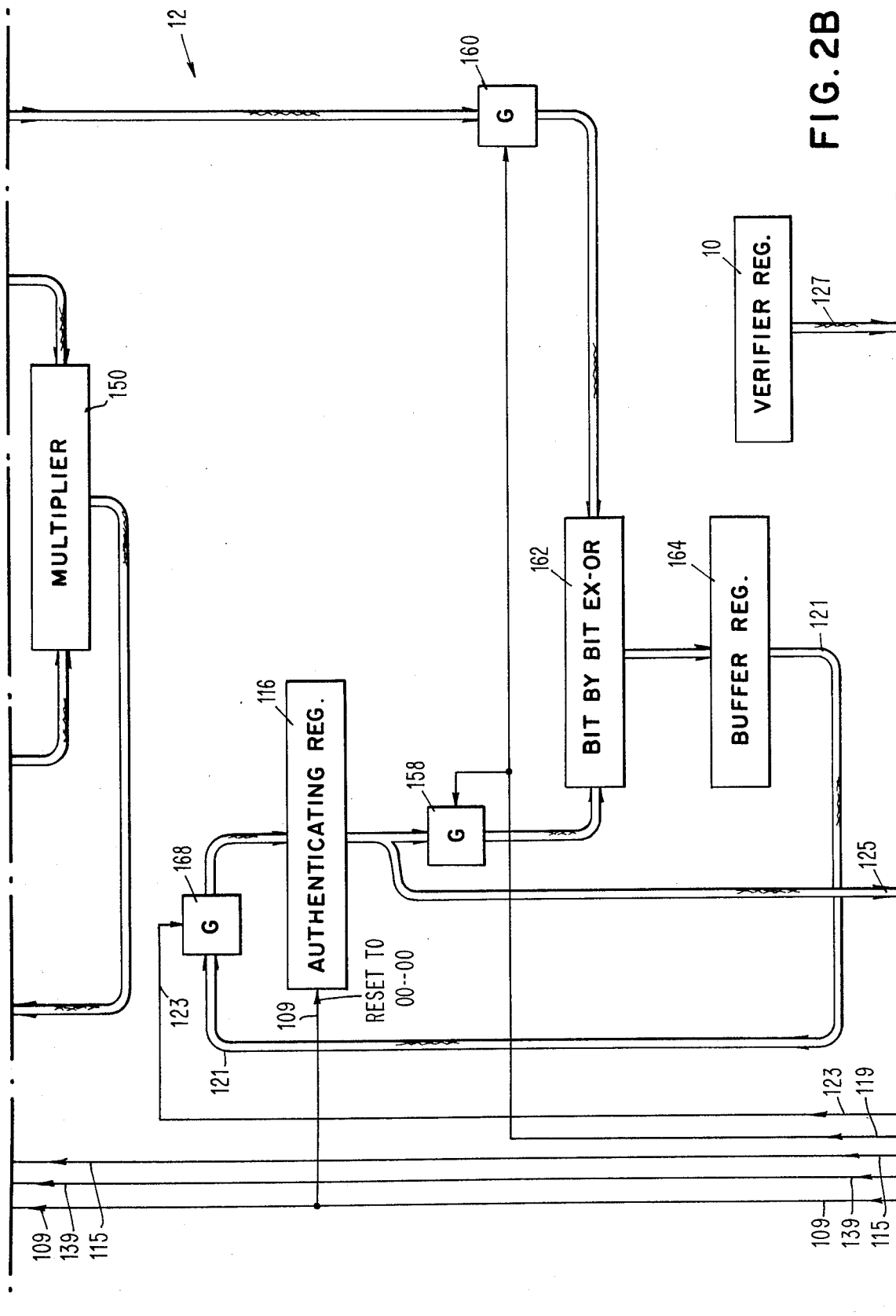

In FIG. 1 there is illustrated generally at 2 a computer system which includes an operating system authenticator 4 which determines the authenticity of a computer program such as operating system code which is to be loaded into the main memory of the computer system. The authenticator 4 includes a timing network 6, a user's identification (UID) storage register 8, a verifier value register 10 and a hash functioning generator 12 which produces an authenticating value. The UID register 8 stores an identification code or secret key which is unique to the valid operating system which is to be stored in the computer system 2. The verifier value stored in the register 10 is a binary value which is a function of the user's identification code and a valid operating system. The verifier value is determined by the computer manufacturer by inserting the identification code and a valid operating system into a hash function generator of the computer manufacturer which is identical to the hash function generator 12 illustrated. After the complete valid operating system has been loaded in the manufacturer's hash function generator for being logically operated on with the identification code, the verifier value is determined. The predetermined verifier value is then stored in a read only storage device such as a magnetic card or the like which is transmitted to a Security Officer of the customer. The verifier card is then inserted in the customer's operating system authenticator under lock and key, such that there can be no access to the verifier storage by unauthorized persons.

A hash function generator is a device which performs logical operations on two or more binary words for providing an output word having a configuration which is difficult if not impossible to reproduce as long as the user's identification code is not known. This is so, since the hash function generator includes a number of storage devices, exclusive OR bit-by-bit comparators, multipliers and the like. It follows that if a plurality of multiple bit words are processed, the statistical probability of being able to deduce a verifier value corresponding to a change in the operating system, is at best remote.

A disk 14 or similar type device is used to transfer the operating system code to a main memory 16 via a data channel 18. The main memory 16 communicates with a central processing unit (CPU) 19 via standard data communication channel 20. The CPU 19 provides a start signal via a line 22 to the authenticator 4 and the date channel 18. The timing network 6 responds to the start signal and transmits a data request signal to the data channel 18 via a line 24. The data channel 18 then concurrently provides the first word of the operating system to the hash function generator 12 and the main memory 16 via a line 26. After each word is loaded into the hash function generator and main memory, a data valid signal is transmitted from the data channel 18 to the timing network 6 via a line 28. In response thereto, the timing network 6 then requests another word of the operating system from the data channel via the data request line 24. This operation continues until the complete operating system to be authenticated is loaded into the main memory and the hash function generator.

The hash function generator responds to the successive words of the operating system and the user's identification code for generating a hash function which serves as an authenticating value. After the complete operating system has been loaded, an operating system loaded signal is transmitted from the data channel 18 to the timing network 6 via a line 30. In response thereto the hash function generator 12 compares the authenticating value with the verifier value stored in the device 10 for determining if the loaded operating system is valid. If the authenticating value and the verifier value compare, a continue normal operation signal is transmitted from the generator 12 to the CPU 19 via a line 32, such that the CPU is informed that normal computer operation may continue. On the other hand, if the authenticating value and the verifier value do not compare, the loaded operating system is not authentic and a terminate CPU operation signal is transmitted via a line 34 to the CPU 18 for terminating computer operation and for signalling an alarm indication.

Figure 2C:
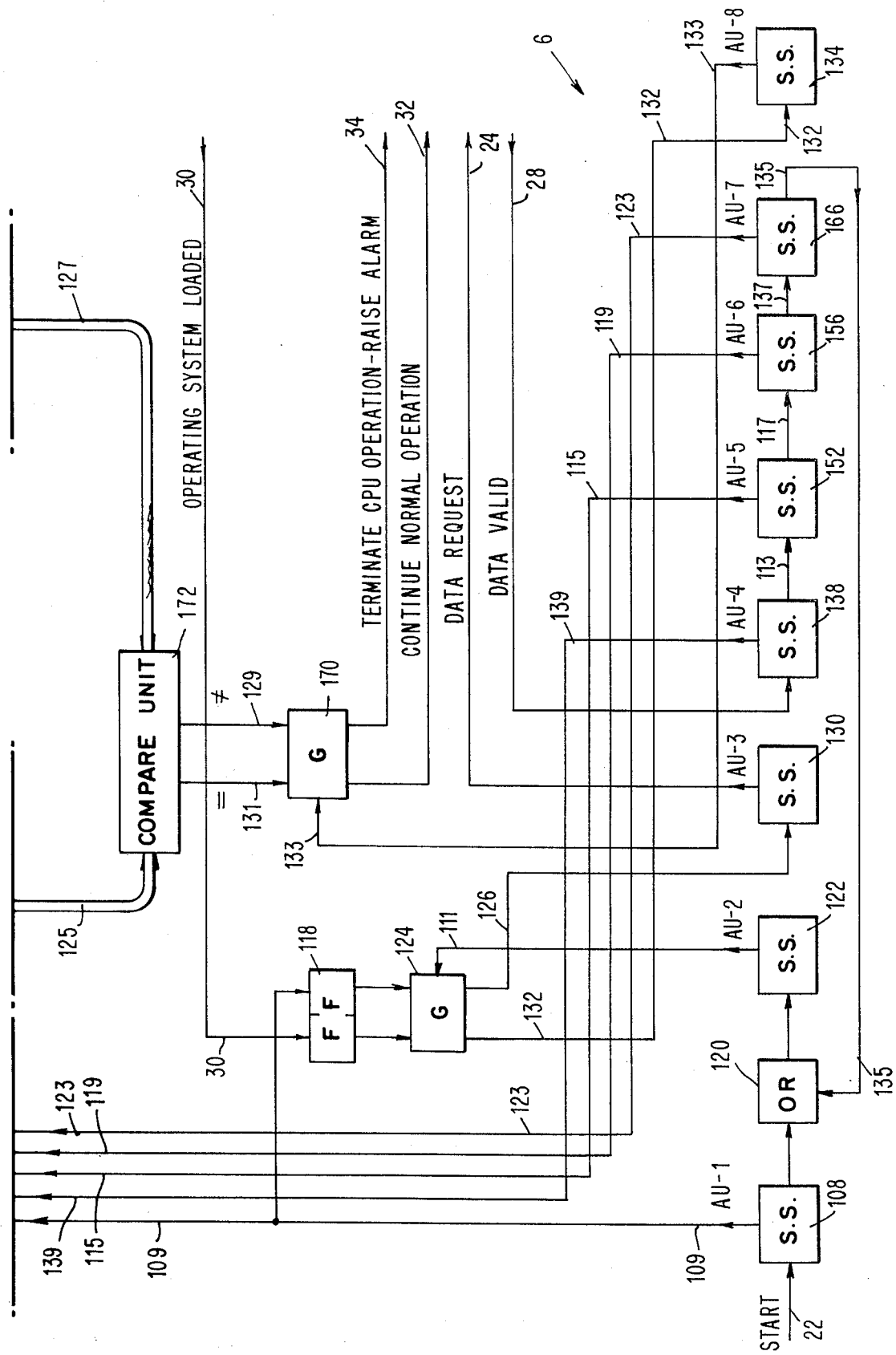

The present invention is set forth in digital hardware form in FIG. 2, however the present invention may also be practiced through the use of a properly programmed general purpose digital computer, or by other suitable logical techniques. FIGS. 2A, 2B and 2C are arranged as set forth in FIG. 2, that is with FIG. 2A on the top, FIG. 2C on the bottom and FIG. 2B therebetween.

With reference to FIG. 2C, the start signal on line 22 is applied to a single shot multivibrator 108 of the timing network 6. In response thereto, an AU-1 pulse is provided on a line 109, for setting a flip-flop 118 to the 0 state; to an authenticating register 116 for setting same to a reference value of 0 and to a gate 112 for passing the contents of the UID storage register 8 to a buffer storage register 114. It is to be appreciated that register 116 may be set to any other suitable reference value. As previously described, the UID register stores the user identification code or secret key which is unique to a valid operating system. When single shot 108 turns off, a pulse is passed from same via an OR gate 120 to turn on a single shot 122 which produces an AU-2 pulse on a line 111 which samples the state of flip-flop 118 by enabling a gate 124. Since the gate 118 has been previously set to the 0 state by the AU-1 pulse, gate 124 provides a gating signal on a line 126 which turns on single shot 130 for providing an AU-3 pulse on the line 24. The AU-3 pulse is the previously described data request signal which requests the first word of the operating system to be loaded into an operating system storage register 134 via the line 26 (FIG. 2A).

When the first word has been loaded into the storage register 134 a data valid signal is applied from the data channel via the line 28 (FIG. 2C) to a single shot 138, turning the single shot on for providing an AU-4 pulse on a line 139. The AU-4 pulse is applied to gates 140 and 142 for passing the contents of registers 134 and 114 to the respective inputs of a bit-by-bit exclusive OR comparator network 144. The result of the bit-by-bit exclusive OR comparison is broken up into first and second portions, with the first portion being applied to a multiplicand (MC) storage register 146 and the second portion being applied to a multiplier (MP) storage register 148. For example, if the user's identification code is a 64-bit word and each word of the operating system is 64 bits, the first 32 bits of the comparison can be stored in the register 146 and the second 32 bits can be stored in the register 148. It is to be appreciated, however, that a different number of bits may be stored in each register. The numbers stored in the respective registers are then multiplied in a multiplier 150 (FIG. 2B), with the product thereof being applied to a first input of a gating network 154 (FIG. 2A).

When the single shot 138 turns off, a pulse is provided on a line 113 for turning on a single shot 152 for providing an AU-5 pulse on a line 115, which pulse is used to enable the gate 154 to pass the product from the multiplier 150 to the input of the buffer register 114. It is seen, that the product now replaces the previously stored user's identification code. The product now stored will be subsequently compared with the second word of the operating system during the next cycle of operation. This process repeats as each successive word of the operating system is loaded. The output of the buffer register 114 is also connected to a first input of a gate 160 (FIG. 2B).

When the single shot 152 turns off, a pulse is provided on a line 117 for turning on a single shot 156 which produces an AU-6 pulse on a line 119 which serves as an enable signal for a gate 158 and the gate 160 (FIG. 2B). This signal enables the gate 158 to pass the reference value of 0 from authenticating register 116 to a first input of a bit-by-bit exclusive OR network 162, which has the product stored in the buffer register 114 applied to a second input thereof via the gate 160. The result of the bit-by-bit exclusive OR comparison by comparator 162 is then stored in a buffer register 164, the output of which is applied to a first input of a gate 168 via a line 121.

When the single shot 156 turns off, a pulse is provided on a line 137 for turning on single shot 166 which produces an AU-7 pulse on a line 123, which pulse is applied to the second input of gating network 168 for passing the contents of register 164 to authenticating register 116 to be stored in place of the reference value previously stored therein.

The output of authenticating register 116 is also applied to a first input of a comparison network 172 (FIG. 2C) via a line 125 as the authenticating value. Applied to the second input thereof is the verifier value from the verifier register 10 via a line 127. The comparator network 172 provides a signal output on a line 129 when there is a lack of comparison and provides a signal output on a line 131 when there is comparison. At this time, in all likelihood, there is a lack of comparison, and a signal appearing on line 129 would be applied to a gating network 170. The gating network 170 is not enabled at this time, however, since there is no AU-8 pulse provided on a line 133. A description of how the AU-8 pulse is provided will be described shortly.

When the single shot 166 turns off, a pulse is provided on a line 135 which is passed by the OR gate 120 for turning a single shot 122 for once again sampling the state of flip-flop 118 to determine if the word just processed is the final word of the operating system. The flip-flop 118 is still in the 0 state, since only the first word has been processed, and accordingly an operating system loaded signal has not yet been provided on the line 30 for setting the flip-flop 118 to the 1 state. As previously described, a pulse output is once again provided from gate 124 on line 126 turning on the single shot 130 for requesting the second word of the operating system. The operation of timing network 6 and authenticator 12 repeats as previously described, for processing the second word of the operating system.

This process continues in a similar manner for each word until the final word of the operating system is loaded.

Assume now that the final word of the operating system has been loaded and the AU-7 pulse has been generated and in turn the single shot 166 has turned off, now providing the pulse on the line 135 which is passed by the OR gate 120 for turning on single shot 122, enabling the gate 124 to sample flip-flop 118, as previously explained. Since the operating system has been completely loaded, the operating system loaded signal has been provided on the line 30 for setting the flip-flop 118 to the 1 state. A pulse is then provided on the line 132 for turning on a single shot 134 which provides an AU-8 pulse on the line 133 for enabling the gate 170 to sample the comparator network 172 which compares the verifier value stored in the verifier register 10 with the authenticating value stored in authenticating register 116. If the loaded operating system is valid, the two values should compare and a signal output is provided on a line 131 which is passed by the gate 170 to the line 32 for informing the CPU to continue normal operation. If, on the other hand, the loaded operating system is invalid the values stored in the register 116 and register 10 should not compare and a signal is provided on the line 129 which is passed by the gate 170 to the line 34 for informing the CPU to terminate operation and to raise an alarm.

In summary, an operating system authenticator has been disclosed which determines if an operating system being loaded in a computer is valid. A user's identification code which is unique to a valid operating system and a verifier value which is a predetermined function of the valid operating system and the identification code are stored in respective locations. A hash function, which is a function of the operating system being loaded and the identification code, is generated by the authenticator as an authenticating value. Once the operating system is loaded, the authenticating value is compared with the stored verifier value for determining the authenticity of the loaded operating system.

What is claimed is:

1. A method of authenticating that a program being loaded into a computer is valid, said method comprising the steps of:
    storing an identification code unique to said program;
    generating an authenticating value as a function of said identification code and at least a given portion of the program being loaded; and
    determining the authenticity of the program being loaded in response to comparing said authenticating value with a prestored verifier value which is a predetermined function of a valid program and said identification code.

2. A method of authenticating that a program being loaded into a computer is valid, said method comprising the steps of:
    storing a secret key unique to said program;
    storing a verifier code which is unique to a valid program and said secret key;
    generating an authenticating value in response to applying said secret key to at least a given portion of the program being loaded; and
    determining the authenticity of the program being loaded in response to comparing said authenticating value with a prestored verifier value which is a predetermined function of a valid program and said secret key.

3. A method of authenticating the validity of an operating system being loaded into a computer, said method comprising the steps of:
    storing an identification code unique to said operating system;
    storing a verifier value which is a predetermined function of said identification code and a valid operating system;
    generating an authenticating value as a hash function of said identification code and the operating system being loaded; and
    determining the authenticity of the operating system being loaded in response to comparing said authenticating value with said verifier value.

4. In a system for determining the authenticity of a program being loaded in a computer, the combination comprising:
    means for storing an identification code unique to said program;
    means for generating an authenticating value which is a function of said identification code and at least a given portion of the program being loaded; and
    means for determining the authenticity of the program being loaded in response to comparing said authenticating value and a prestored verifier value which is a predetermined function of a valid program and said identification code.

5. In a system for determining the authenticity of an operating system being loaded in a computer, the combination comprising:
    means for storing a secret key which is unique to said operating system;
    means for storing a verifier value which is a predetermined function of said secret key and a valid operating system;
    means for generating an authenticating value which is a function of the secret key and the operating system being loaded; and
    means for determining the authenticity of the operating system being loaded in response to comparing said authenticating value with said verifier value.

6. The combination claimed in claim 5, including:
    means for terminating computer operation in response to the comparison not being equal.

7. In a system for determining the authenticity of an operating system being loaded in a computer, the combination comprising:
    means for storing in a first storage location an identification code unique to said operating system;
    means for storing in a second storage location a verifier value which is a predetermined function of said identification code and a valid operating system;
    means for sequentially storing said operating system a word at a time in a third storage location;
    means for comparing the contents of said first and third storage locations, including means for breaking up the result of the comparison into first and second portions;
    means for taking the product of said first and second portions, with the resultant product being stored in said first storage location in place of what was previously stored, for comparison with the following word of said operating system and so on until the complete operating system has been sequentially stored;
    means for initially storing a reference word in a fourth storage location;

means for comparing the contents of said first and fourth storage locations after each successive word of said operating system has been stored, with the result of the comparison being stored in said fourth storage location in place of what was previously stored; and means for determining the authenticity of the operating system being loaded in response to comparing the contents of said second and fourth storage locations following the complete sequential storage of said operating system.

8. An apparatus for determining the authenticity of an operating system being loaded in a computer, the combination comprising:

a first storage register in which an identification code for said operating system is stored;

a second storage register in which a verifier value which is a predetermined function of a valid operating system and said identification code is stored;

a third storage register in which said operating system is loaded a word at a time;

a fourth storage register;

a first gating network connected between said first and fourth registers for passing the contents of said first register to said fourth register during a first timing interval;

a first bit-by-bit comparator network having first and second inputs and two outputs;

second and third gating networks connected between said third storage register and said first input and said fourth register and said second input, respectively, of said first bit-by-bit comparator for passing the contents thereof during a second timing interval;

a multiplier having first and second inputs and an output;

fifth and sixth storage registers connected between the first output of said first bit-by-bit comparator and the first input of said multiplier and the second output of said first bit-by-bit comparator and the second input of said multiplier, respectively, with the contents of said fifth and sixth storage register being multiplied in said multiplier;

a fourth gating network connected between the output of said multiplier and said fourth storage register for passing the contents of said multiplier to said fourth register during a third timing interval;

a seventh storage register having an input and an output and in which is initially stored a reference value;

a second bit-by-bit comparator network having first and second inputs and an output;

fifth and sixth gating networks connected between the output of said seventh register and the first input, and the output of said fourth register and the second input, respectively, of said second bit-by-bit comparator for passing the contents thereof during a fourth timing interval;

an eighth storage register having an input connected to the output of said second bit-by-bit comparator, and also having an output;

a seventh gating network connected between the output of said eighth storage register and the input of said seventh storage register for passing the contents of said eighth storage register to said seventh storage register during a fifth timing interval;

a third comparator having first and second inputs and an output, with the first input being connected to the output of said second storage register and the second input being connected to the output of said seventh storage register; and an eighth gating network connected to the output of said third comparator for sampling the results of the comparison during a sixth timing interval, with a first signal being provided which is indicative that the operating system being loaded is valid if there is a comparison, and a second signal being provided which is indicative that the operating system being loaded is invalid if there is a lack of comparison.

* * * * *